United States Patent [19]

Nacman

[11] Patent Number: 5,790,166
[45] Date of Patent: Aug. 4, 1998

[54] MODULATOR FOR DOUBLING RESOLUTION IN THE FAST-SCAN DIRECTION FOR A LASER IMAGER IN AN ELECTROPHOTOGRAPHIC PRINTER

[75] Inventor: Aron Nacman, Penfield, N.Y.

[73] Assignee: Xerox Corporation, Stamford, Conn.

[21] Appl. No.: 895,870

[22] Filed: Jul. 17, 1997

[51] Int. Cl.[6] ............................................. G02F 1/01
[52] U.S. Cl. ........................... 347/255; 347/247; 395/556
[58] Field of Search .................................... 347/237, 247, 347/249, 255; 327/119, 122; 395/555, 556

[56] References Cited

U.S. PATENT DOCUMENTS

| | | | |
|---|---|---|---|
| 4,807,156 | 2/1989 | Parisi | 364/519 |
| 5,438,353 | 8/1995 | Morrison | 347/250 |
| 5,504,462 | 4/1996 | Cianciosi et al. | 332/109 |
| 5,517,230 | 5/1996 | Lofthus et al. | 347/235 |
| 5,572,721 | 11/1996 | Rostamian | 395/555 |
| 5,590,316 | 12/1996 | Hausauer | 395/556 |

*Primary Examiner*—N. Le
*Assistant Examiner*—Hai Pham
*Attorney, Agent, or Firm*—R. Hutter

[57] ABSTRACT

A modulator circuit for use in driving a laser in an electrophotographic laser printer starts with a standard, inexpensive low-frequency pixel clock for timing the modulation of the laser to form an image, and effectively doubles the modulation frequency, thereby allowing spatial resolution to be doubled in the fast-scan direction. An original, low-frequency pixel clock is split, one of the split signals is delayed by a predetermined amount, and the original and delayed pixel clocks are applied to an exclusive OR gate. The modulator of the present invention functions without either a high-frequency original pixel clock or a phase-locked loop.

5 Claims, 3 Drawing Sheets

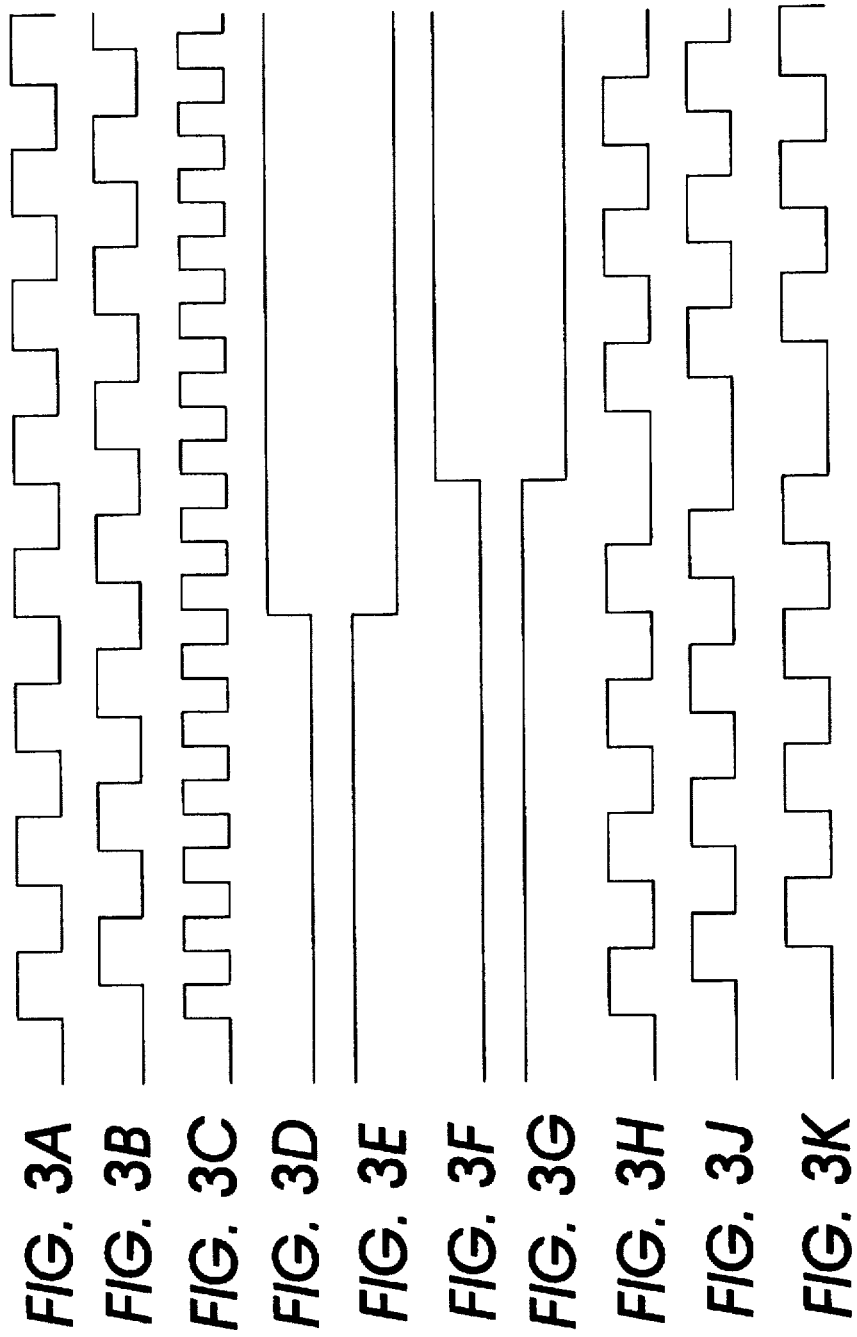

MODULATOR FOR DOUBLING RESOLUTION IN THE FAST-SCAN DIRECTION FOR A LASER IMAGER IN AN ELECTROPHOTOGRAPHIC PRINTER

FIELD OF THE INVENTION

The present invention relates to a circuit for driving a laser used to create an image on a photoreceptor in an electrophotographic "laser" printer. More specifically, the present invention relates to a simple modulator circuit which can effectively double the resolution of the apparatus in the fast-scan direction.

BACKGROUND OF THE INVENTION

Electrophotographic printing apparatus wherein a laser scanline is projected onto a photoconductive surface is well-known. In the case of laser printers, facsimile machines, and the like, it is common to employ a raster output scanner (ROS) as a source of signals to be imaged on a precharged photoreceptor. The ROS provides a laser beam which is modulated according to digital image data as the beam moves, or scans, across the photoreceptor. Commonly, the surface of the photoreceptor is selectably imagewise discharged by the laser in locations to be printed white, to form the desired image on the photoreceptor. The modulation of the beam to create the desired image on the photoreceptor is facilitated by digital data controlling the laser source. A common technique for effecting this scanning of the beam across the photoreceptor is to employ a rotating polygon surface; the laser is reflected by the facets of the polygon, creating a sweeping motion of the beam which forms a scanline across the photoreceptor. A large number of the scanlines on a photoreceptor together form a raster of the desired latent image. Once a latent image is formed on the photoreceptor, the latent image is subsequently developed with toner, and the developed image is transferred to a print sheet, as in the well-known process of xerography.

An important parameter which is inherent to a particular laser printer is the "resolution" of the printer; that is, the size of individually-addressable spots with which the printer is capable of rendering an image. Typical resolutions of commercially-available laser printers range from 300×300 spi (spots per inch) up to 1200 spi in one or both dimensions. Of course, a relatively high resolution will enable the apparatus to output generally higher-quality images, but of course higher resolutions may require more expense, and also create more difficult requirements in the processing of image data.

With a rotating-polygon ROS, the two critical dimensions are the process direction (the direction in which the photoreceptor moves), and the fast-scan direction (the direction in which the laser reflected from the polygon scans), which is perpendicular to the process direction. While improving the resolution along the process direction may be difficult, as controlling the process direction velocity affects the entire architecture of the printing apparatus, resolution can be increased in the fast-scan direction by simply increasing the modulation frequency of the laser. For this reason, some types of electrophotographic printing apparatus specify resolutions which are different in different dimensions, such as 600×1200 spi. Therefore, it is desirable to provide a system in which the imagewise modulation of the laser can be increased in frequency.

To take the simple, but very useful, case of taking a basic 600×600 spi printer architecture and increasing the resolution in the fast-scan direction to 1200 spi by effectively doubling the modulation frequency of the laser, what is generally necessary is to increase the clock frequency of the laser modulation. This clock frequency can then be superimposed on image data to operate the laser at the desired frequency. In the prior art there are generally two known ways of effectively doubling this clock frequency: one can either start out with a clock with twice the standard frequency, or one can use a phase-locked loop (PLL) to effectively double the original clock frequency. Both of these systems have practical disadvantages. Briefly, to use a higher-frequency clock at the start may not only be expensive, but could also cause complications with electromagnetic interference created by the apparatus. A PLL is also expensive, and may also require that the doubled frequency be re-divided back to a lower frequency at some point in order to realize a practical system.

The present invention is a simple design of a modulator which can facilitate the effect doubling of the clock frequency, without the practical disadvantages of prior-art systems.

DESCRIPTION OF THE PRIOR ART

U.S. Pat. No. 4,807,156 discloses a control system for a raster output scanner in which the resolution of the apparatus is adjusted by periodically stealing cycles from a pixel clock signal which controls the operation of both the rotating polygon and/or the moving photoreceptor.

U.S. Pat. No. 5,517,230 discloses a raster output scanner capable of creating images within a wide range of selectable resolutions. The motion of both the polygon and the photoreceptor is monitored at high resolution to influence a pair of feedback loops.

SUMMARY OF THE INVENTION

According to the presesnt invention, there is provided a method and apparatus for modulating a laser according to imagewise digital data in a raster output scanner. A pixel clock input is accepted, and imagewise digital data is accepted in two parallel channels. A pixel clock doubler is provided, the pixel clock doubler including a first delay buffer and an exclusive-OR gate having a first input and a second input. The pixel clock doubler directs the pixel clock input through the first delay buffer to the first input of the exclusive-OR gate and simultaneously directly into the second input of the exclusive-OR gate, thereby yielding a doubled pixel clock from an output of the exclusive-OR gate. The imagewise digital data in the two parallel channels are multiplexed into a single output channel. The multiplexed imagewise digital data is accepted in a flip-flop and the multiplexed imagewise digital data is output from the flip-flop in response to the doubled pixel clock.

BRIEF DESCRIPTION OF THE DRAWINGS

FIGS. 3A–3H and 3J–3K are a series of signals illustrating the operation of the circuit of FIG. 2.

DETAILED DESCRIPTION OF THE INVENTION

Figure 1:
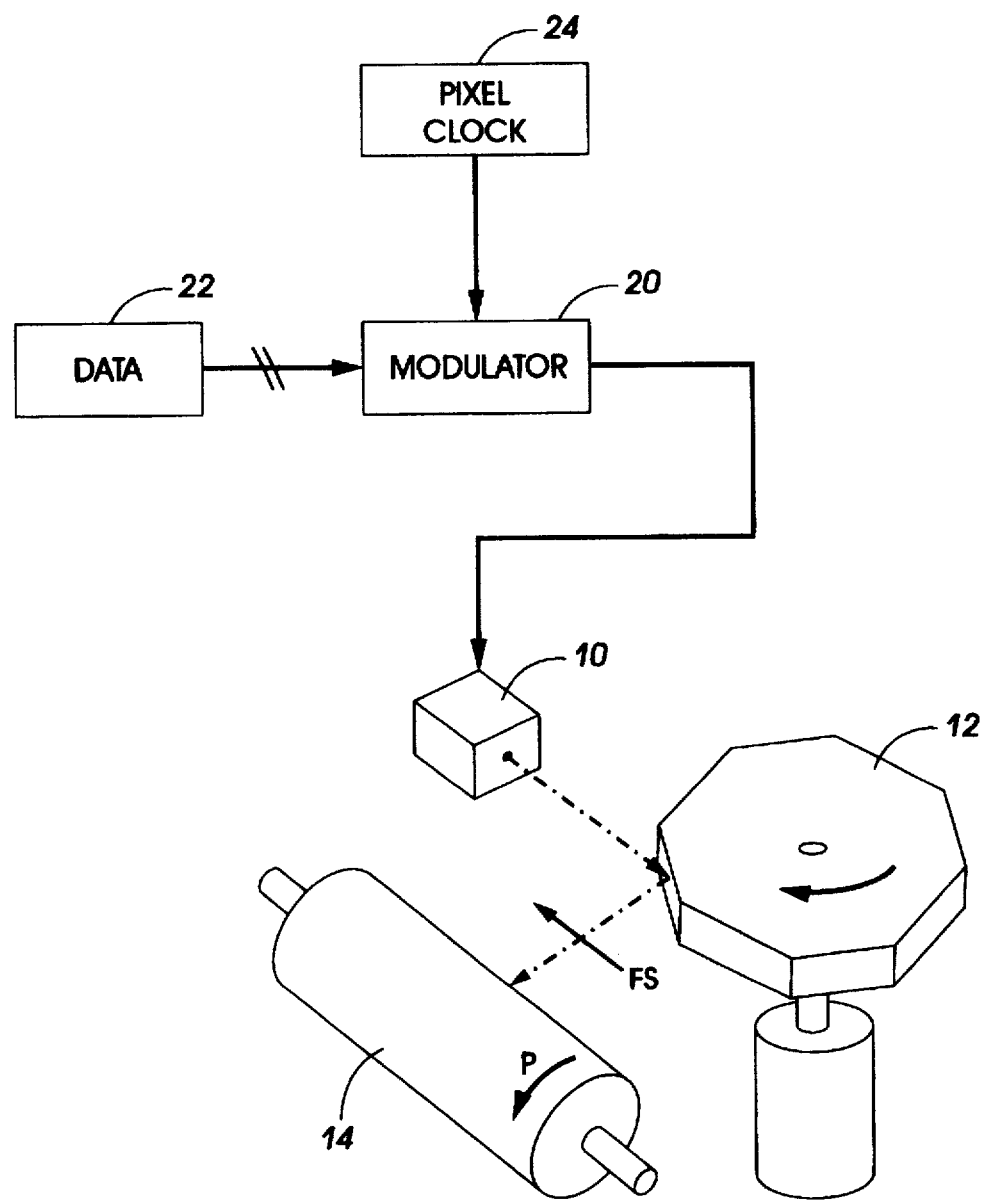
FIG. 1 is a simplified block diagram showing the essential elements of a system for modulating a laser in an electrophotographic printer, as would be used in conjunction with he present invention.

FIG. 1 is a block diagram showing the basic elements of a system for controlling a laser which creates a desired latent image, according to digital data, on a photoreceptor. As shown in the Figure, a laser source 10 emits a laser beam which is reflected from the facets of a rotating polygon 12; the reflected beam is thus caused to move along the surface of a photoreceptor 14, which in this particular case is in the form of a drum. The photoreceptor 14 moves in a process direction here indicated as P, and the moving spot caused by the reflected beam moves in a fast-scan direction FS along the length of the photoreceptor 14, in a direction perpendicular to process direction P.

The laser emitted from laser source 10 is controlled by imagewise digital data which turns the beam on or off depending on which specific portion of the desired latent image is being exposed by the laser at a particular time. In the arrangement of elements shown in the Figure, the laser 10 is directly driven by what is here called a modulator 20. The modulator 20 accepts video image data from a source 22, and then uses this data to modulate the laser source 10 according to the timed output (typically a square wave) of a "pixel clock" 24. The output of pixel clock 24 ultimately controls the frequency of signals from modulator 20 to control laser source 10, and, in turn, controls the resolution in the fast-scan direction FS of a latent image created by the laser on photoreceptor 14.

Figure 2:
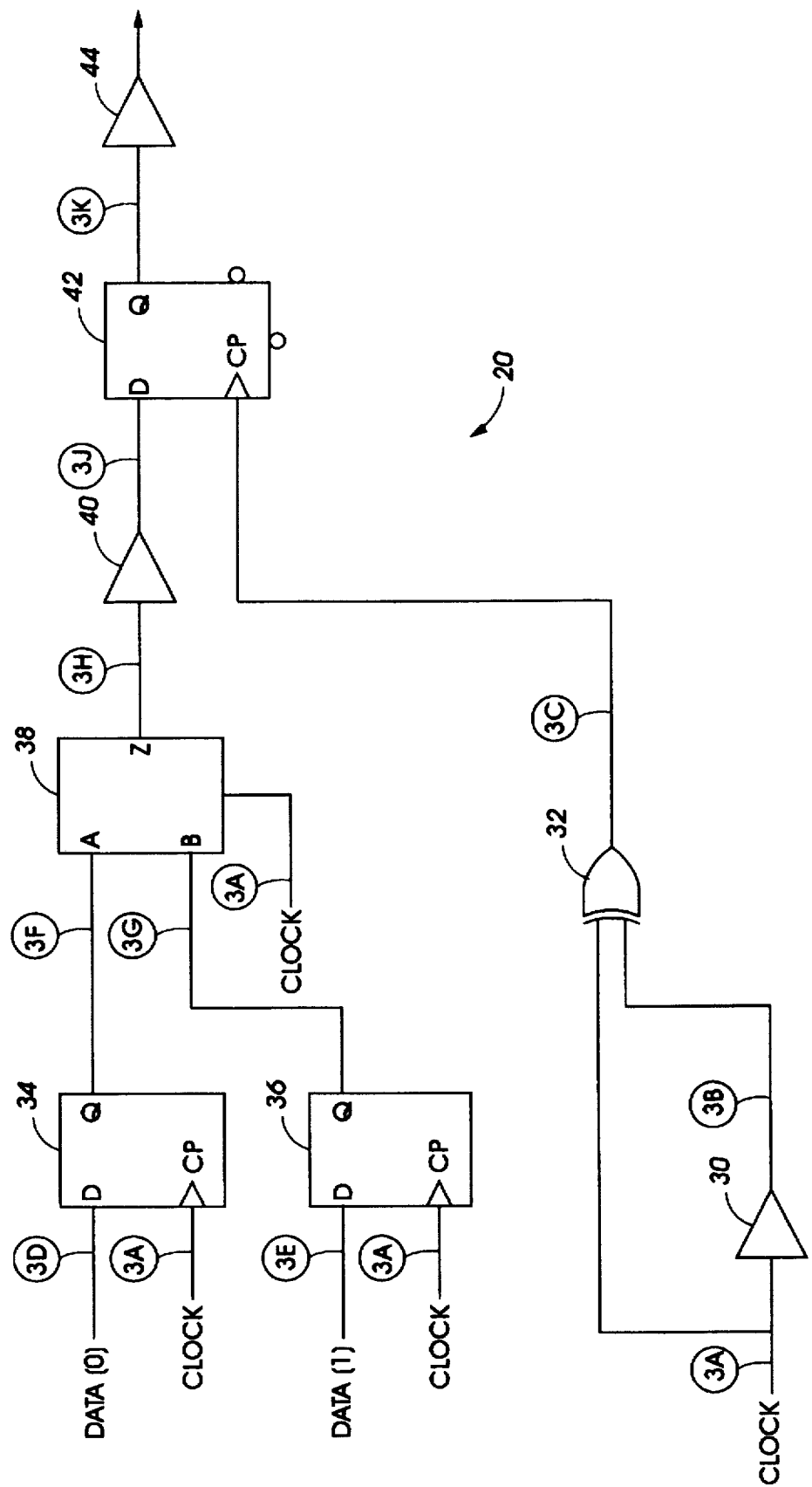
FIG. 2 is a schematic diagram of a modulator circuit according to the present invention.

FIG. 2 is a schematic diagram showing the essential elements of a modulator, such as 20 shown in FIG. 1, according to the present invention. FIGS. 3A-3K refer to signals which would be evident at various locations within the circuit of FIG. 2, as indicated by the indicia at various locations in FIG. 2. FIG. 3A shows the basic, relatively low-frequency clock pulse, which is applied to the portions marked 3A in FIG. 2. In a preferred embodiment of the present invention, this clock pulse is the standard clock pulse consistent with a 600 spi output of digital image data from laser source 10; the requirements for outputting this standard pixel clock are well-established in the art and can be obtained fairly inexpensively.

The clock pulse from pixel clock 24 is typically a square wave, as shown in FIG. 3A. With reference to elements 30 and 32 in FIG. 2, the clock pulse is entered into a delay buffer 30, and the original clock pulse and the output of this delay buffer 30 (of course, a delayed version of the original clock pulse in FIG. 3A, which is hereshown in FIG. 3B) are simultaneously submitted to an exclusive-OR gate 32. Exclusive OR gate 32 outputs a high signal only when the original clock pulse of FIG. 3A is different in value from the delayed clock pulse of FIG. 3B. If the delay caused by delay buffer 30 is selected to be approximately one-fourth the period of the clock pulse of FIG. 3A, the output of the exclusive OR gate 32, shown at FIG. 3C, is effectively a doubled clock pulse, that is a square wave with twice the frequency of the original clock pulse of FIG. 3A. This doubled clock pulse of FIG. 3C is then applied to a multiplexed video signal, as will be described in detail below.

According to a preferred embodiment of the invention, video signals relating to pixels which neighbor each other in the fast-scan direction are accepted by modulator 20 two at a time, each pair of pixel signals being accepted in parallel, on respective lines DATA(0), an example input of which is shown as FIG. 3D, and DATA(1), an example input of which is shown as FIG. 3E. Spatially, these two signals will correspond to neighboring pixel-sized areas aligned in direction FS on the surface of photoreceptor 14.

The inputs, effectively relating to alternating pixels along the fast-scan direction, are latched respectively into what are here called "data" flip-flops 34 and 36, the purpose of which is simply to stabilize the changing video data so that the signals can be held long enough for multiplexing. The data flip-flops 34-36 output the data latched therein in response to the basic pixel clock signal (FIG. 3A). It will be noted that data flip-flops 34 and 36 have the effect of delaying a change in the video signal by a fixed amount of time as shown by comparison of FIGS. 3D and 3E to FIGS. 3F and 3G, both before and after the video signals pass through the data flip-flops 34, 36.

The outputs of flip-flop 34 and 36 are then multiplexed by a multiplexer 38; it can be seen that multiplexer 38 also accepts a clock pulse such as in FIG. 3A as the multiplexer select line. The multiplexed signals, shown at FIG. 3H, are then submitted to a delay buffer 40 and then submitted to a flip-flop 42. The purpose of delay buffer 40, which creates the delayed output shown at FIG. 3J, is that the delayed doubled clock pulse from exclusive OR gate 32 must have a rising edge which is fed into flip-flop 42 only after a particular signal value is established and stabilized, to avoid a setup or hold violation in the operation of flip-flop 42. Only after each change in value of the multiplexed pixel train in FIG. 3J has stabilized will the doubled pixel clock of FIG. 3C allow the video signal to be output from flip-flop 42, as shown by FIG. 3K. This final output, which may be buffered as necessary, such as by buffer 44, directly drives the laser source 10, either by directly causing a laser diode in laser source 10 to reach a lasing voltage, or else otherwise operating a shutter or other modulator device within laser source 10.

As can be seen, the final output of the modulator 20 of the present invention is a multiplexed signal train in which outputs on the two data lines (FIGS. 3D and 3E) are output in pairs over time, with the output being made at a rate which is twice that of either data line such as in FIGS. 3D or 3E. In applying the modulator 20 to an electrophotographic printer, the doubling of the pixel output enables the laser from laser source 10 to be modulated at double the ordinary rate, and this in turn enables an effective doubling of the spatial resolution of pixels in the FS direction (assuming a constant velocity of the beam relative to the photoreceptor 14 in the fast-scan FS direction).

The range of acceptable delay values for delay buffers 30 and 40 is dependent on the original clock frequency and the frequency response of the ASIC technology used. If the delay associated with buffer 30 is made too large then the output of exclusive OR gate 32 (FIG. 3C) will have a short negative pulse width at a particular operating frequency which may violate design rules for a particular ASIC technology used. If the delay associated with buffer 30 is made too small then the output of exclusive OR gate 32 will have a short positive pulse width at a particular operating frequency which may violate design rules for a particular ASIC technology used. If the delay associated with buffer 40 is made too large then a setup violation could occur at flip-flop 42 for a particular operating frequency and ASIC technology used. If the delay associated with buffer 40 is made too small then a hold violation could occur at flip flop 42 for a particular operating frequency and ASIC technology used.

Overall, the key feature of the modulator 20 according to the present invention is the use of exclusive-OR gate 32 in combination with delay buffer 30 to directly derive the doubled clock signal, such as shown in the difference between the original clock signal in FIG. 3A and the doubled clock signal in FIG. 3C. This step of starting with a relatively low frequency original pixel clock such as in FIG. 3A and then doubling it as necessary yields a desirable result with key practical advantages over prior art techniques for carrying out this pixel rate doubling. As mentioned above, one prior-art technique for doubling the resolution in the fast-scan direction is simply to start with a double-speed pixel clock which originally outputs a pixel clock consistent with a 1200 spi output. However, an oscillator which generates this signal originally not only adds a significant expense to a laser printing apparatus, but also will cause problems with meeting requirements for electromagnetic interference. Besides, even if such a high-frequency oscillator is provided, in most designs of such a laser modulator, for one reason or another this original high-frequency signal must be eventually divided down to a lower-frequency signal to accomplish other purposes. Dividing down the original high-frequency pixel clock provides an unpredictable delay to the entire system, and indeed such a delay may even be unpredictable in the sense of being, for example, temperature-dependent.

Similarly, another prior-art technique for obtaining the doubled-frequency pixel clock, use of a PLL, also adds expense to the device, and also requires extra pins to be provided for in a modulator chip. Further, with a PLL, the relationship of rising edges for the original low-frequency pixel clock and the derived doubled-frequency pixel clock is difficult to determine, and typically a relatively high frequency pixel clock obtained with the PLL must eventually be re-divided down where a lower-frequency pixel clock is needed. The present invention, in short, obtains the necessary doubled-frequency pixel clock directly from the original low-frequency pixel clock, and ensures that the doubled-frequency pixel clock is of a known and fixed relationship in time with the original low-frequency pixel clock. Thus, the modulator of the present invention enables this doubling of modulation in the fast-scan direction with an inexpensive set of circuit elements, with none of the practical drawbacks of prior-art arrangements.

While the invention has been described with reference to the structure disclosed, it is not confined to the details set forth, but is intended to cover such modifications or changes as may come within the scope of the following claims.

I claim:

1. A modulator for driving a laser according to imagewise digital data in a raster output scanner, comprising:

means for accepting a pixel clock input;

means for accepting imagewise digital data in two parallel channels;

a pixel clock doubler, the pixel clock doubler including a first delay buffer and an exclusive-OR gate having a first input and a second input, the pixel clock doubler directing the pixel clock input through the first delay buffer to the first input of the exclusive-OR gate and simultaneously directly into the second input of the exclusive-OR gate, thereby yielding a doubled pixel clock from an output of the exclusive-OR gate;

a multiplexer for multiplexing the imagewise digital data in the two parallel channels into a single output channel;

a flip-flop, accepting multiplexed imagewise digital data from the single output channel and outputting the multiplexed imagewise digital data in response to the doubled pixel clock; and a second delay buffer interposed between the multiplexer and the flip-flop.

2. The modulator of claim 1, the first delay buffer delaying a signal passing therethrough by approximately one-fourth a period of the pixel clock input.

3. A modulator for driving a laser according to imagewise digital data in a raster output scanner, comprising:

means for accepting a pixel clock input;

means for accepting imagewise digital data in two parallel channels;

a pixel clock doubler, the pixel clock doubler including a first delay buffer and an exclusive-OR gate having a first input and a second input, the pixel clock doubler directing the pixel clock input through the first delay buffer to the first input of the exclusive-OR gate and simultaneously directly into the second input of the exclusive-OR gate, thereby yielding a doubled pixel clock from an output of the exclusive-OR gate;

a multiplexer for multiplexing the imagewise digital data in the two parallel channels into a single output channel;

a flip-flop, accepting multiplexed imagewise digital data from the single output channel and outputting the multiplexed imagewise digital data in response to the doubled pixel clock; and a data flip-flop associated with each of the two parallel channels, each of said data flip-flops accepting a video signal and outputting the video signal to the multiplexer in response to the pixel clock input.

4. A method for modulating a laser according to imagewise digital data in a raster output scanner, comprising the steps of:

accepting a pixel clock input;

accepting imagewise digital data in two parallel channels;

providing a pixel clock doubler, the pixel clock doubler including a first pixel clock doubler directing the pixel clock input through the first delay buffer to the first input of the exclusive-OR gate and simultaneously directly into the second input of the exclusive-OR gate, thereby yielding a doubled pixel clock from an output of the exclusive-OR gate;

multiplexing the imagewise digital data in the two parallel channels into a single output channel;

accepting the multiplexed imagewise digital data from the single output channel in a flip-flop and outputting the multiplexed imagewise digital data from the flip-flop in response to the doubled pixel clock; and delaying a signal passing from the multiplexer to the flip-flop.

5. The method of claim 4, the first delay buffer delaying a signal passing therethrough by approximately one-fourth a period of the pixel clock input.

* * * * *